May 5, 1942.  A. POTIGIAN  2,281,712
FORCE MEASURING DEVICE
Filed May 21, 1938  5 Sheets-Sheet 1

ARMEN POTIGIAN
INVENTOR.

BY *William C. Blackburn*
ATTORNEY.

May 5, 1942.  A. POTIGIAN  2,281,712
FORCE MEASURING DEVICE
Filed May 21, 1938   5 Sheets-Sheet 3
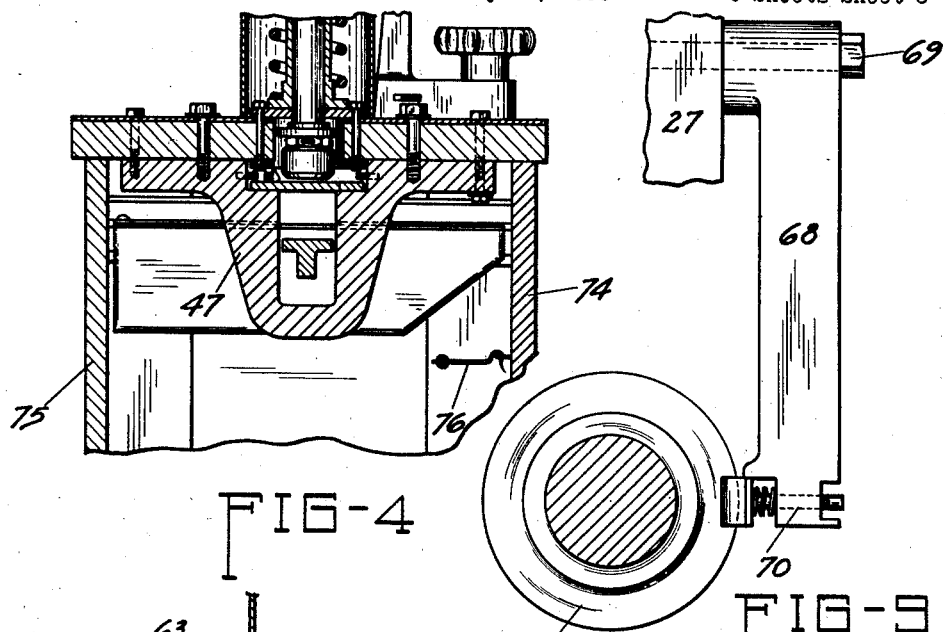
FIG-4
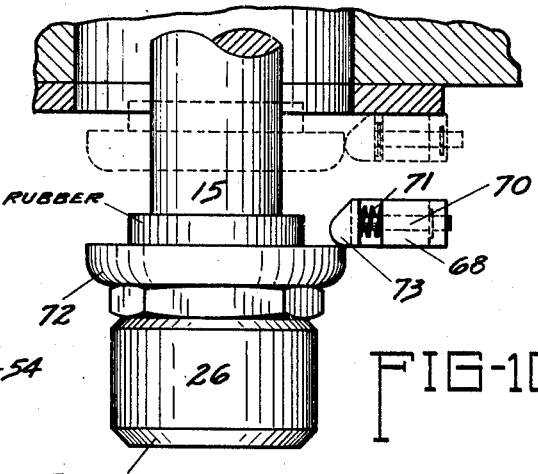
FIG-9
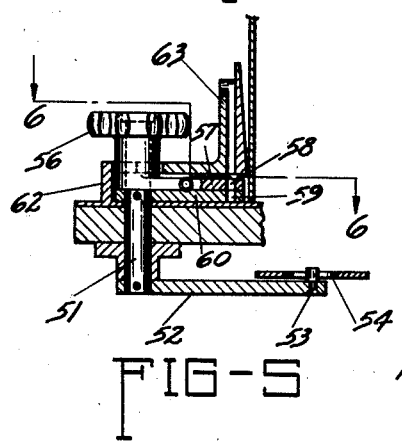
FIG-5
FIG-10
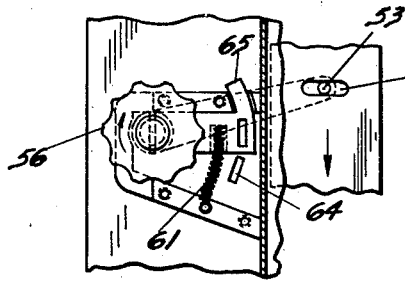
FIG-6
ARMEN POTIGIAN   INVENTOR.
BY *William C. Blackburn*
ATTORNEY.

May 5, 1942.　　　A. POTIGIAN　　　2,281,712
FORCE MEASURING DEVICE
Filed May 21, 1938　　　5 Sheets-Sheet 4

ARMEN POTIGIAN  INVENTOR.

BY *William C. Blackburn*
ATTORNEY.

May 5, 1942.  A. POTIGIAN  2,281,712
FORCE MEASURING DEVICE
Filed May 21, 1938  5 Sheets-Sheet 5

ARMEN POTIGIAN INVENTOR.

BY *William C. Blackburn*
ATTORNEY.

Patented May 5, 1942

2,281,712

UNITED STATES PATENT OFFICE 2,281,712

FORCE MEASURING DEVICE

Armen Potigian, Davenport, Iowa

Application May 21, 1938, Serial No. 209,190

5 Claims. (Cl. 265—21)

The present invention relates to and has for its objects to provide a muscular force measuring device of improved design and controlling means therefor which normally render the device inoperative. Further objects are to provide an improved check lock suitable for use with the type of device indicated, and a register to indicate the force applied to the machine.

Figure 1:
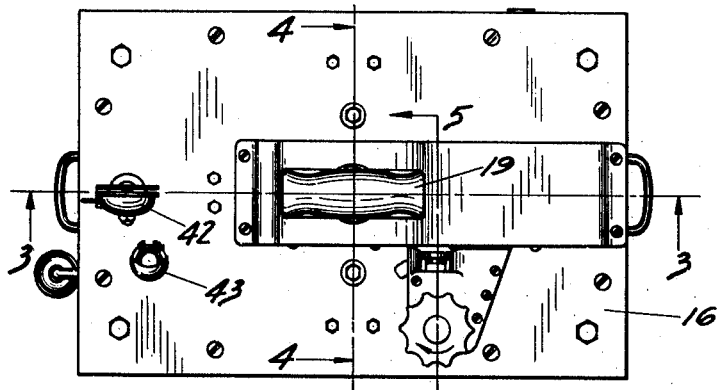
Figure 2:
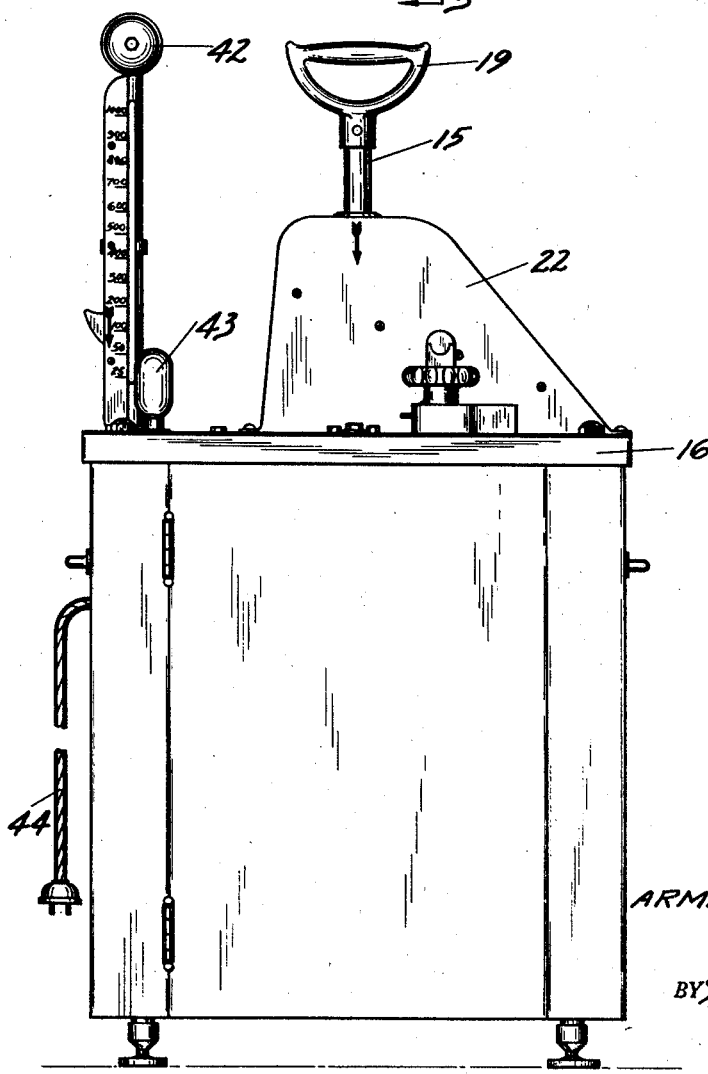
Figure 3:
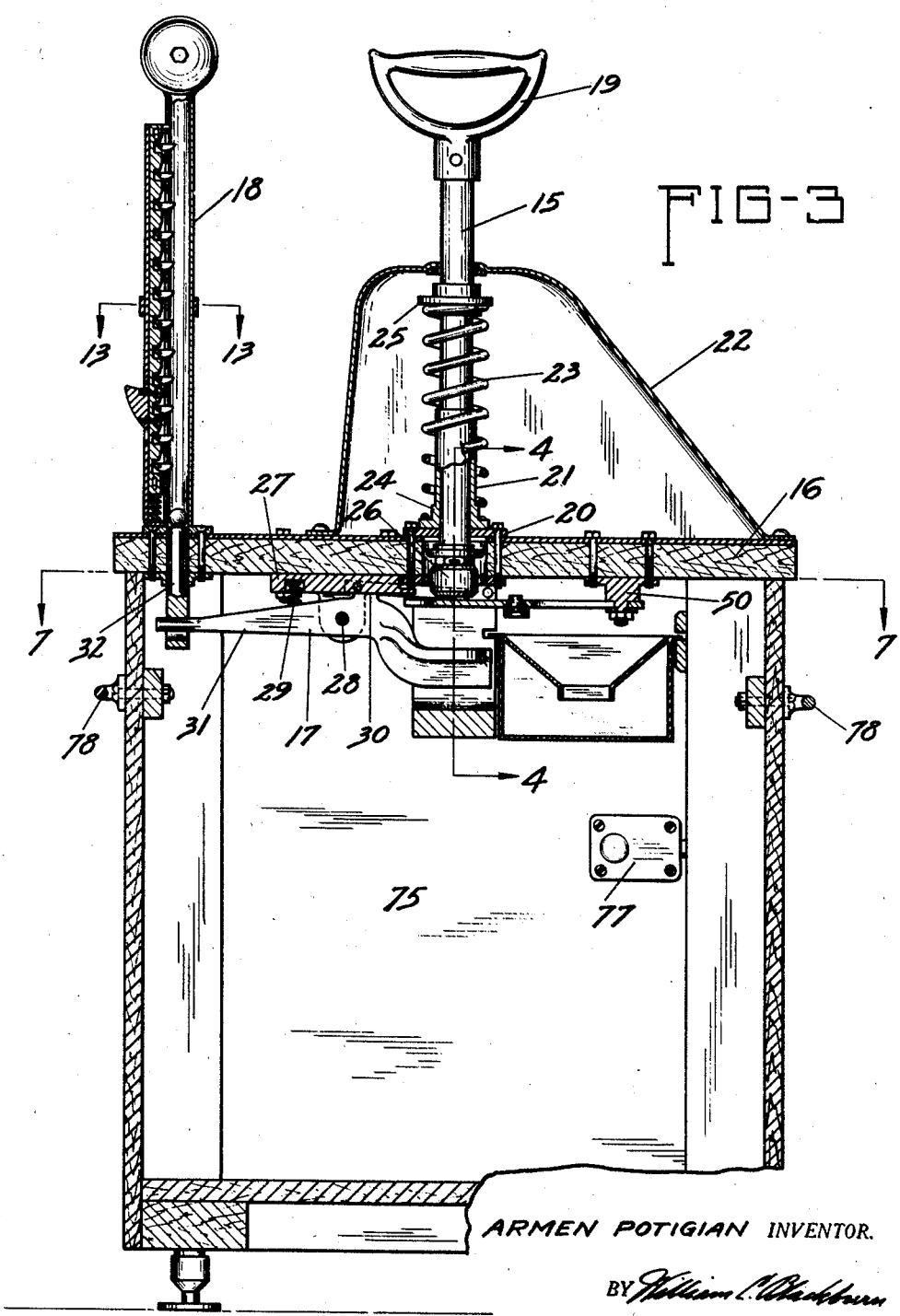
Figure 7:
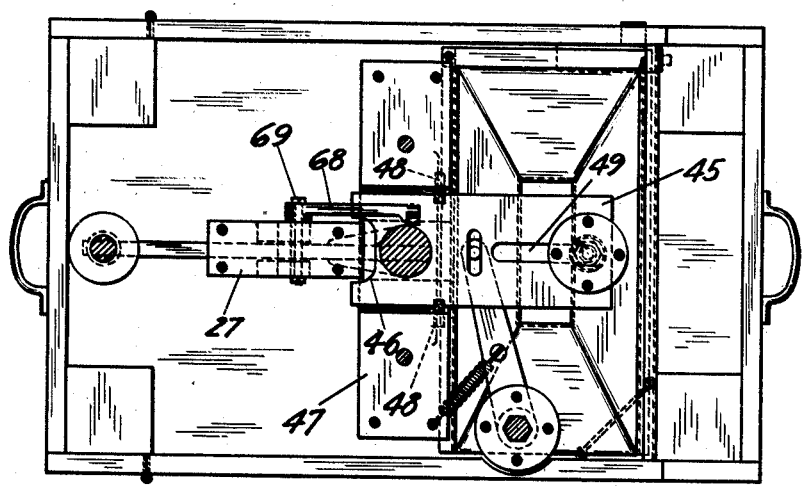
Figure 8:
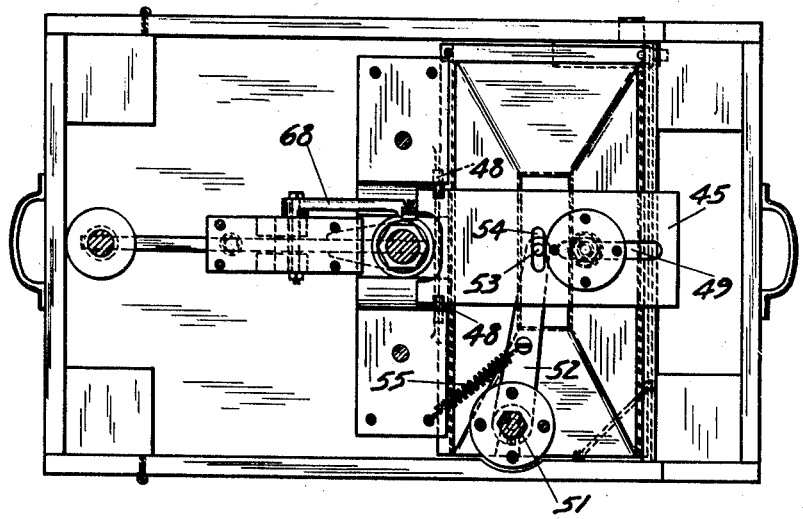

For a more complete understanding of the present invention, and the scope thereof, together with further objects thereof, reference may be had to the following detailed description taken in conjunction with the accompanying drawings, wherein:

Fig. 1 is a plan view of one form of my invention with the parts thereof assembled in operative position, Fig. 2 is a front elevation thereof, Fig. 3 is a vertical longitudinal section substantially on the line 3—3 of Fig. 1, Fig. 4 is a fragmentary vertical section substantially on the line 4—4 in Fig. 1 to show the lower portion of the plunger and associated parts, Fig. 5 is a fragmentary vertical section substantially on the line 5—5 of Fig. 1 to show the parts, operative to place the machine in released position, and related check-controlled parts, Fig. 6 is a longitudinal view, partially in section, substantially on the line 6—6 of Fig. 5, Fig. 7 is a section on the line 7—7 in Fig. 3, showing the machine in normal position, Fig. 8 is a section on the line 7—7 in Fig. 3, showing the machine in released position with the plunger depressed.

Figure 11:
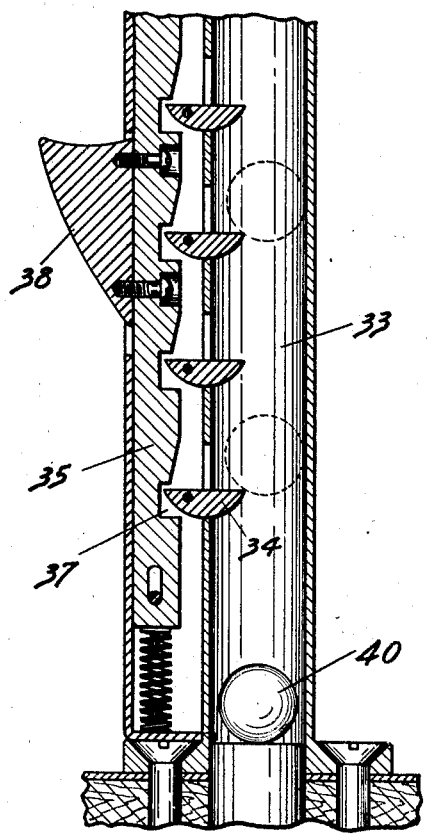
Figure 12:
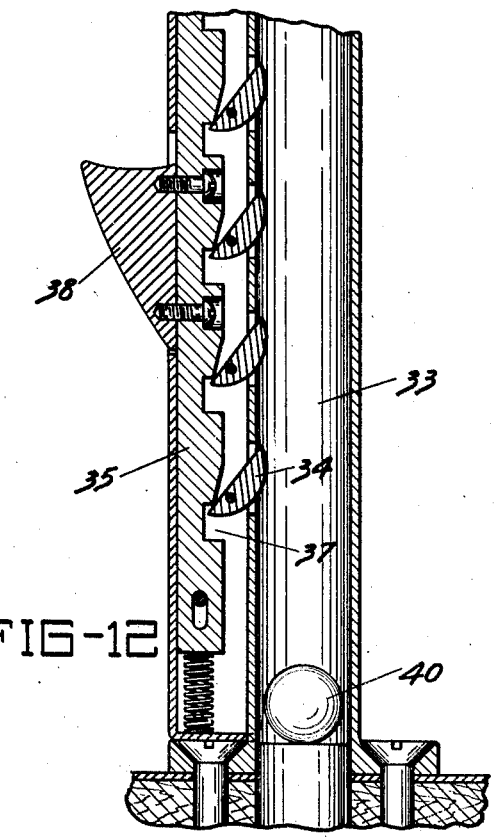
Figure 14:
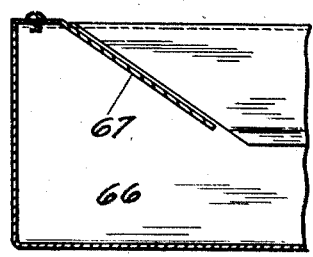
Figure 13:
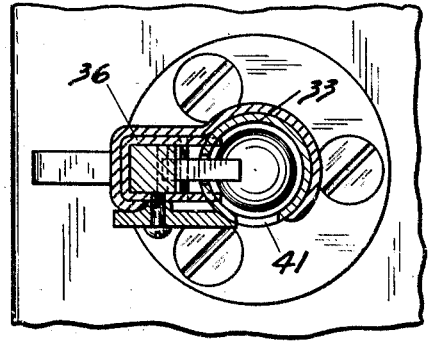

Fig. 9 is a fragmentary section from above the plunger head when the plunger is in depressed position, Fig. 10 is an elevation of the plunger head and associated parts to illustrate the action of the plunger in releasing the machine to normal position, Fig. 11 is a fragmentary section on the line 3—3 in Fig. 1 showing the lower end of the register in normal position, Fig. 12 is a section similar to Fig. 11 showing the register in released position, Fig. 13 is a longitudinal section on the line 13—13 in Fig. 3, and Fig. 14 is a detail of a portion of the coin box.

The muscular force measuring device of the present invention involves a plunger 15 mounted in a vertical position in the lid 16 of a cabinet, which when depressed strikes against a lever 17 with varying force depending upon the force with which the plunger is depressed. Depending upon this force, the lever 17 operates a register 18 varying amounts, indicating thereby the force exerted.

The plunger 15 has a handle 19 secured to its upper end to provide for effective application of force manually to the plunger, which is guided in proximity to the lid 16 by a plate 20 and a sleeve 21 mounted on the lid, and at its upper portion by a cap 22, also mounted on the lid, the plunger working through an opening in the cap. A compression spring 23 is mounted on the plunger and has one end in contact with a shoulder 24 on the sleeve 21 and the other end in contact with a collar 25 secured to the plunger. A rubber head 26 is securely attached to the lower end of the plunger and is arranged to strike against lever 17 in operation.

The lever 17 is pivoted to plate 27, mounted on the under side of the lid 16, by pin 28 and is provided with a spring 29 bearing against the plate 27 and an arm of the lever to hold boss 30 on the other arm of the lever in contact with the plate. The register end 31 of the lever 17 passes through a vertically slidable hammer 32 in the lower end of the register 18. Above the hammer the register is provided with a tubular section 33 into which extend a plurality of vertically spaced horizontally pivoted arms 34. A gang operator 35 for the arms 34 is positioned for vertical movement in a channel 36 in which the arms are pivoted. The gang operator 35 is provided with a plurality of notches 37 within each of which an end of one of the arms is received. A handle 38 is secured to the gang operator and extends through the channel so that the operator may be depressed against the action of spring 39 positioned at the lower end of the operator. A ball 40 is provided in the section 33 to register the force applied, and the section 33 is provided with a slot 41 in its front face so that the position of the ball may be observed. An indicator, such as bell 42, may be provided at the upper end of section 33 to give an audible indication if maximum force is applied to the machine. If desired, a light 43, which may be connected to a source of power by the electric cord 44, may be provided in order better to observe the position of the register.

Referring now more particularly to sheets 2 and 4 of the drawings, a horizontally slidable locking plate 45 is mounted so that in normal position one end thereof extends below the plunger 15. The end of the plate 45 adjacent the plunger is notched, as at 46, to allow passage of the plunger when the plate is in released position. The plate is carried for sliding movement in a recess in support 47, and pins 48 are mounted in the support 47 above the plate 45 to maintain it in proper vertical adjustment. The end of plate 45 away from the plunger 15 is provided with a longitudinal slot 49 in which a guide 50 is positioned, allowing longitudinal movement of the plate.

In order to move plate 45 into and out of normal position, shaft 51 is journaled in the lid 16 in a vertical position. Arm 52, keyed to the lower end of shaft 51, is provided with a pin 53 which works in slot 54 in plate 45 so that turning of the shaft moves the plate. A tension spring 55 is secured to arm 52 and to support 47 to urge the plate to a normal position beneath the plunger. A knob 56 freely turnable on shaft 51 is secured on the upper end thereof. To the lower end of knob 56 an arm 57 is secured which is provided with a slot 58 of suitable size for a check such as a coin. The slot 58 registers with a slot 59 in an arm 60, keyed to shaft 51, when the plate 45 is in normal position and the knob is turned to the left under action of compression spring 61 which is mounted to press, respectively, against arm 57 and a casing 62 which covers both arms. A coin chute 63 is positioned above and in registry with the slots 58 and 59 when they are in normal position. The lower arm 59 moves over the surface of the lid, and there is provided in the lid a slot 64 through which a coin may discharge when the machine is in released position and the force tending to turn the knob is released. When the knob is in the moved position, extension 65 on arm 57 prevents any coins in the chute from dropping into casing 62.

To receive coins from slot 64, a coin box 66 is provided therebelow, which has downwardly and inwardly directed flanges to prevent easy emptying of the box in case looting of the machine is attempted. One of the flanges 67 is removable, as shown in Fig. 14, to facilitate removal of the coins from the box.

In order to hold plate 45 in released position, an arm 68 pivoted to plate 27 and 69 is provided, the arm extending to a position adjacent the plunger and of a length to drop into abutting engagement with the plate 45 in released position. At the free end of arm 68, an operator 70 is mounted to slide toward and away from the plunger 15 and is pressed by spring 71 thereon toward the plunger. A flange 72 is secured to the plunger just above the head 26. The edges of flange 72 and the head 73 of operator 70 are formed at such angles that when the plunger is depressed the flange readily passes the operator but on upward movement considerable force must be exerted before the operator will be depressed thereby causing arm 68 to be withdrawn from its lowered position. This is accomplished by having the meeting faces on downward motion at a considerable angle to the plunger and the meeting faces on upward motion at almost a right angle thereto. As shown in Fig. 10 in full lines, the arm 68 is in abutting position and the plunger has risen just sufficiently that the flange has engaged the operator 73, while in the dotted line position the arm has been raised out of abutting engagement with the plate and into engagement with the lid, and the flange has started to pass the operator 70. Upon further rising of the plunger, the arm 68 will drop from the dotted line position onto the top of the plate ready to move into abutting engagement when the plate is again withdrawn.

The cabinet may be provided with suitable doors 74, 75, one of which may be secured in closed position by hooks 76 inside the cabinet and the other by a lock 77. Handles 78 of any suitable variety may be secured to the ends of the cabinet.

In operation, a suitable coin is dropped through the coin chute 63 into engagement with the arms 57 and 60 whereby the handle 56 is locked to the shaft 51. The handle is then turned to the right whereby the plate 45 is moved from the normal position, shown in Fig. 7, to the released position, shown in Fig. 8, in which position the pivoted arm 68 drops into abutting engagement with the end of plate 45 and prevents return of the plate to normal position.

The machine then being in released position, the player grips the handle 19 and with considerable force depresses the handle and the plunger 15 secured thereto. The flange 72 on the plunger during downward movement slips readily by the head 73 which is moved outward. If adequate force is applied to the handle, the lever 17 is turned to the right, as seen in Fig. 3, thereby raising the hammer and throwing the ball 40 up in the register. When the pressure on the handle is released, the plunger will be elevated by the spring 23, during which motion the flange 72 will catch below the head 73 and raise the arm 68 out of engagement with the plate 45 whereupon the plate will return to normal position under the plunger. When arm 68 has been raised into engagement with the lid, the pressure is great enough that the flange 72 passes the head 73. The operator may at any time observe the position of the ball 40 in the register through the opening 41. The ball may then be released by depressing the handle 38, and the machine is then ready to be operated again as above described.

Having now described my invention, I claim:

1. In a device of the character described, a plunger mounted for reciprocation between normal and moved positions, a member slidable across the line of reciprocation of said plunger between a normal position in which it extends across the line of reciprocation of said plunger and prevents motion from a normal to a moved position and a moved position in which it does not so extend, and an arm movable to a normal position when said member is placed in moved position to hold said member in its moved position and thereby allow reciprocation of said plunger to moved position, said plunger having an extension projecting laterally therefrom and cooperating with said arm to move the arm out of normal position as said plunger moves to normal position, said arm having a part to cooperate with the laterally projecting extension on the head.

2. In a device of the character described, a manually actuated plunger mounted for reciprocation, an arm pivotally mounted adjacent the plunger and having an end movable to a limited extent lengthwise of the plunger, a spring pressed latch on said arm and an extension on said plunger for cooperation with the spring pressed latch on said arm, the extension and latch being so shaped that upon motion of the plunger in one direction the meeting faces thereof are at an acute angle to the direction of reciprocation of said plunger, and upon motion in the opposite direction at substantially a right angle to the direction of reciprocation thereof.

3. In a device of the character described, a plunger mounted for substantially vertical reciprocation, an arm pivotally mounted adjacent the plunger and having an end engaging the plunger laterally and movable vertically to a limited extent therewith, a member spring pressed to a normal position extending under the plunger when the latter is in elevated position and with said end above said member, and means to withdraw said member out of normal position, said arm being movable downwardly when said member is so withdrawn to engage an end of said member and prevent return thereof to normal position.

4. In a device of the character described, a plunger mounted for substantially vertical reciprocation, an arm having an end movable vertically to a limited extent adjacent the plunger, a member spring pressed to a normal position extending under the plunger when in elevated position and with said end above said member, means to withdraw said member out of normal position, said arm being movable downwardly when said member is so withdrawn to engage said member and prevent return thereof to normal position, and cooperating means on said plunger and arm to withdraw said arm from engaging position when said plunger moves upwardly.

5. In a device of the character described, a plunger mounted for substantially vertical reciprocation, an arm having an end movable vertically to a limited extent adjacent the plunger, a member spring pressed to a normal position extending under the plunger when in elevated position and with said end above said member, means to withdraw said member out of normal position, said arm being movable downwardly when said member is so withdrawn to engage said member and prevent return thereof to normal position, a spring pressed operator on said arm, and an extension on said plunger for cooperation with said operator, the extension and operator being so shaped that upon motion of the plunger in one direction the meeting faces thereof are at an acute angle to the direction of reciprocation of said plunger, and upon motion in the opposite direction at substantially a right angle to the direction of reciprocation thereof.

ARMEN POTIGIAN.